United States Patent
Kato et al.

(10) Patent No.: US 9,778,638 B2
(45) Date of Patent: Oct. 3, 2017

(54) PROGRAMMABLE LOGIC CONTROLLER COMMUNICATION SYSTEM

(71) Applicant: JTEKT Corporation, Osaka (JP)

(72) Inventors: Satoshi Kato, Kariya (JP); Yasuteru Yamauchi, Anjo (JP); Terukazu Senda, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 313 days.

(21) Appl. No.: 14/090,564

(22) Filed: Nov. 26, 2013

(65) Prior Publication Data

US 2014/0163698 A1 Jun. 12, 2014

(30) Foreign Application Priority Data

Dec. 7, 2012 (JP) ................................. 2012-267746

(51) Int. Cl.
*G05B 19/02* (2006.01)
*H04L 12/24* (2006.01)
(Continued)

(52) U.S. Cl.
CPC ........... *G05B 19/02* (2013.01); *G05B 19/052* (2013.01); *H04L 12/403* (2013.01);
(Continued)

(58) Field of Classification Search
CPC ................. G05B 19/02; G05B 19/051; G05B 2219/2104; H04L 12/403; H04L 41/0677; H04L 41/0631; H04L 41/22
See application file for complete search history.

(56) References Cited

U.S. PATENT DOCUMENTS 5,226,037 A * 7/1993 Satomi .................... H04L 12/56
340/2.9
5,390,326 A * 2/1995 Shah ................... G06F 11/2007
370/222
(Continued)

FOREIGN PATENT DOCUMENTS

JP           H02-235104 A      9/1990
JP           H06-324723 A      11/1994
WO    WO 2013/151550 A1    10/2013

OTHER PUBLICATIONS

Extended European Search Report issued Mar. 12, 2014 in Patent Application No. 13195414.1.
U.S. Appl. No. 14/243,159, filed Apr. 2, 2014, Senda, et al.

*Primary Examiner* — Sean Shechtman
*Assistant Examiner* — David Wynne
(74) *Attorney, Agent, or Firm* — Oblon, McClelland, Maier & Neustadt, L.L.P.

(57) ABSTRACT

A PLC communication system includes a PLC; a plurality of devices; three or more communication processing nodes that are provided respectively in the PLC and the devices to allow the PLC to communicate with each of the devices; and a plurality of communication lines that connect the communication processing nodes to each other to allow data communication. The PLC detects an incommunicable state between two of the communication processing nodes. The PLC communication system further includes a display device, and in a case where there are a plurality of types of incommunicable states detected by the PLC, the display device displays a portion where communication lines constituting the incommunicable states among the plurality of communication lines overlap with each other, as a line failure portion.

7 Claims, 8 Drawing Sheets

(51) Int. Cl.
*H04L 12/403* (2006.01)
*G05B 19/05* (2006.01)

(52) U.S. Cl.
CPC .. *H04L 41/0677* (2013.01); *G05B 2219/1204* (2013.01); *H04L 41/0631* (2013.01); *H04L 41/22* (2013.01)

(56) References Cited

U.S. PATENT DOCUMENTS

| | | | |
|---|---|---|---|
| 5,600,657 A | 2/1997 | Orita | |
| 5,790,558 A * | 8/1998 | Nakamura | G05B 19/4063 714/704 |
| 6,970,919 B1 * | 11/2005 | Doi | H04L 41/0631 345/440 |
| 7,166,930 B2 * | 1/2007 | Young | G09G 3/3413 307/64 |
| 7,437,615 B2 * | 10/2008 | Iwamitsu | G06F 11/0727 714/43 |
| 2002/0181503 A1 * | 12/2002 | Montgomery, Jr. | H04J 3/085 370/468 |
| 2003/0191831 A1 * | 10/2003 | Hu | H04L 69/40 709/223 |
| 2004/0155899 A1 * | 8/2004 | Conrad | H04L 43/0817 715/736 |
| 2004/0158780 A1 * | 8/2004 | Conrad | H04L 41/22 714/100 |
| 2006/0230188 A1 * | 10/2006 | Shirane | G05B 19/052 710/1 |
| 2007/0014233 A1 * | 1/2007 | Oguro | H04L 41/0677 370/216 |
| 2008/0151744 A1 * | 6/2008 | Yakushiji | H04L 12/2697 370/219 |
| 2009/0207922 A1 * | 8/2009 | Yokomitsu | H04B 3/542 375/257 |
| 2010/0063754 A1 * | 3/2010 | Thomas | G01R 31/086 702/59 |
| 2011/0179342 A1 * | 7/2011 | Kim | H04L 43/0817 714/807 |
| 2012/0026891 A1 * | 2/2012 | Kamiya | H04L 41/0677 370/242 |
| 2014/0336784 A1 * | 11/2014 | Senda | G05B 19/4185 700/7 |

* cited by examiner

PROGRAMMABLE LOGIC CONTROLLER COMMUNICATION SYSTEM

INCORPORATION BY REFERENCE/RELATED APPLICATION

This application claims priority to Japanese Patent Application No. 2012-267746 filed on Dec. 7, 2012, the disclosure of which, including the specification, drawings and abstract, is incorporated herein by reference in its entirety.

BACKGROUND OF THE INVENTION

1. Field of the Invention

The invention relates to a system in which communication is performed between a programmable logic controller (PLC) and other devices, and when a communication line failure has occurred, the location of the failure can be identified.

2. Discussion of Background

A programmable logic controller (hereinafter referred to as "the PLC") operates by communicating with other devices. Regarding a PLC, Japanese Patent Application Publication No. 6-324723 (JP 6-324723A) describes that in the case where one station is to receive data from another station, if the data is unable to be received for a predetermined period of time and a timer reaches a set time, it is determined that a communication failure has occurred. Japanese Patent Application Publication No. 2-235104 (JP 2-235104A) describes that the number of times retried calling operation has been performed is displayed to determine the number of retries that have been required for establishing data exchange communication.

However, if many communication devices are connected, it is difficult to identify a failed portion in communication lines.

SUMMARY OF THE INVENTION

The invention provides a programmable logic controller communication system that allows an operator to identify the location of a communication line failure when the communication line failure has occurred.

According to a feature of an example of the invention, there is provided a programmable logic controller communication system including: a programmable logic controller; a plurality of devices; three or more communication processing nodes that are provided respectively in the programmable logic controller and the devices to allow the programmable logic controller to communicate with each of the devices; and a plurality of communication lines that connect the communication processing nodes to each other so as to allow data communication, wherein the programmable logic controller detects an incommunicable state between two of the communication processing nodes, and wherein the programmable logic controller communication system further includes a display device, and in a case where there are a plurality of types of incommunicable states detected by the programmable logic controller, the display device displays a portion where communication lines that constitute the incommunicable states among the plurality of communication lines overlap with each other, as a line failure portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
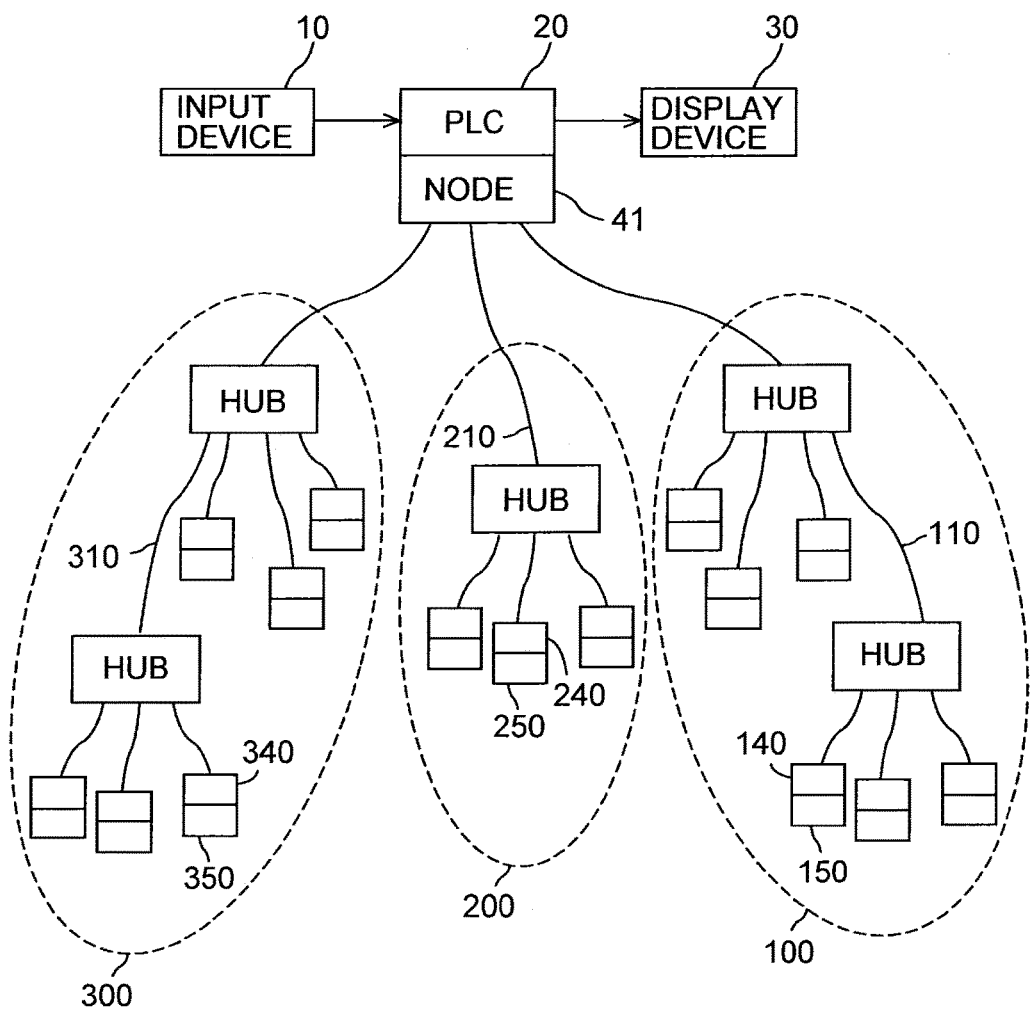
FIG. 1 is a configuration diagram showing an entire PLC communication system according to a first embodiment of the invention.

The configuration of an entire network system that includes a PLC communication system according to a first embodiment will be described with reference to FIG. 1. As shown in FIG. 1, the network system includes a programmable logic controller (hereinafter referred to as "the PLC") 20, which controls a machine tool or the like, and performs communication with other devices.

The network system includes, in addition to the PLC 20, an input device 10 that inputs parameters and network configuration diagrams to the PLC 20, and a display device 30 that displays information regarding the PLC 20. The network system further includes a communication processing node 41 (hereinafter referred to simply as "the node") connected to the PLC 20. The node 41 is compliant with FL-net (controller level network based on Ethernet, standardized by Japan Electrical Manufacturers' Association), FL remote that is a form of the FL-net, and DeviceNet (registered trademark).

Referring to FIG. 1, the network system forms an FL-net 100, an FL remote 200 and a DeviceNet 300 through the node 41. The FL-net 100 includes a communication line 110, a plurality of nodes 140 communicably connected to the node 41 through the communication line 110, and other devices 150 each of which is connected to a corresponding one of the nodes 140.

The FL remote 200 includes a communication line 210, a plurality of nodes 240 communicably connected to the node 41 through the communication line 210, and other devices 250 each of which is connected to a corresponding one of the nodes 240. The DeviceNet 300 includes a communication line 310, a plurality of nodes 340 communicably connected to the node 41 through the communication line 310, and other devices 350 each of which is connected to a corresponding one of the nodes 340.

The other devices 150 communicably connected to the node 41 by the FL-net 100 include, for example, another PLC. The other devices 250 communicably connected to the node 41 by the FL remote 200 include, for example, I/O modules, such as an actuator and a sensor. The other devices 350 communicably connected to the node 41 by the DeviceNet 300 include, for example, another PLC and an I/O module. In each of the FL-net 100, the FL remote 200, and the DeviceNet 300, the number of other devices to be connected can be increased by using a hub or hubs.

The display device 30 displays an entire network configuration diagram, i.e., an entire communication line diagram. Further, the display device 30 displays a device failure, a line failure, and a line requiring caution, respectively, by different display methods, for example, by using different colors.

The PLC communication system according to the present embodiment will now be described with reference to FIG. 2. The PLC communication system according to the present embodiment corresponds to a portion of the network system shown in FIG. 1, the portion including the input device 10, the PLC 20, the display device 30, the node 41, and the FL-net 100. However, FIG. 2 shows only some of the nodes in the FL-net 100.

Figure 2:
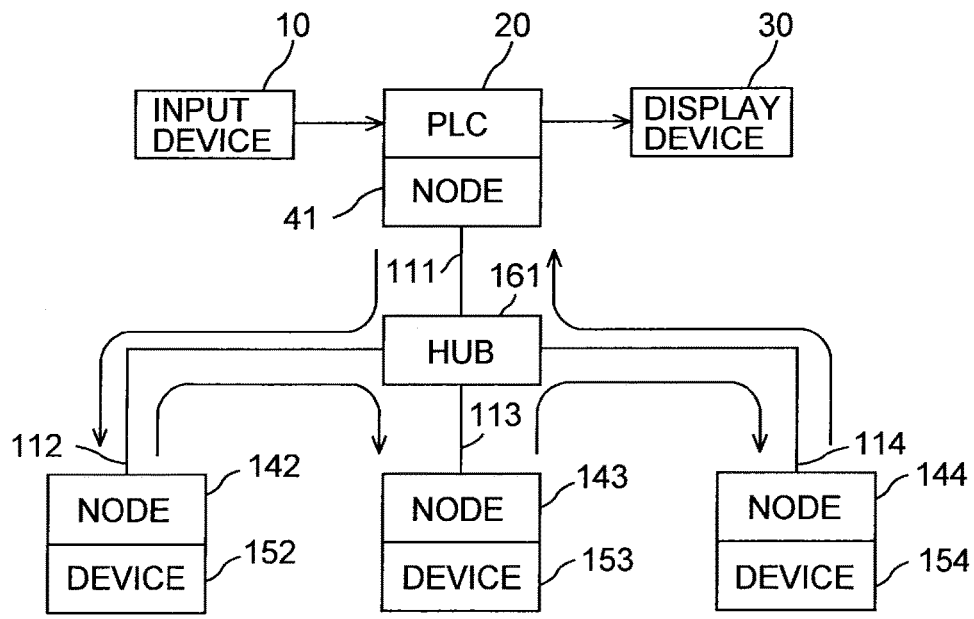
FIG. 2 is a diagram showing a network configuration of a portion extracted from an FL-net (controller level network based on Ethernet, standardized by Japan Electrical Manufacture's Association) in the PLC communication system in FIG. 1, and showing transfer paths through which a token (transmission right) is transferred.

As shown in FIG. 2, the PLC communication system includes the input device 10, the PLC 20, the display device 30, the node 41 connected to the PLC 20, nodes 142, 143, and 144 connected through a hub 161, and other devices 152, 153, and 154 connected to the nodes 142, 143, and 144, respectively. Further, the PLC communication system includes communication lines 111 to 114 that are compliant with the FL-net, to provide interconnection among the nodes 41 and 142 to 144 so that data communication can be performed. The lines 111, 112, 113, and 114 connect the nodes 41, 142, 143, and 144, respectively, to the hub 161.

In the FL-net 100, each of the nodes 41, 142, 143, and 144 transfers the transmission right, i.e., token, of data in a predetermined order. In FIG. 2, the token is transferred in the order of the node 41, the node 142, the node 143, the node 144, and the node 41, as indicated by the arrows. The node having the token can transmit data to another node. For example, when the node 143 receives the token from the preceding node, namely, the node 142, the node 143 transmits data to another node within a specified time from the time point at which the node 143 receives the token. Upon the elapse of the specified time, the node 143 sends the token to the succeeding node, namely, the node 144.

However, for example, if the node 144 is unable to receive the token at a timing at which the node 144 should receive the token from the node 143 for some reason, the node 144 reissues a token, i.e., performs a retry. More specifically, the node 144 issues a new token and transmits required data to another node and then sends the token to the specified succeeding node, namely, the node 41.

Figure 3:
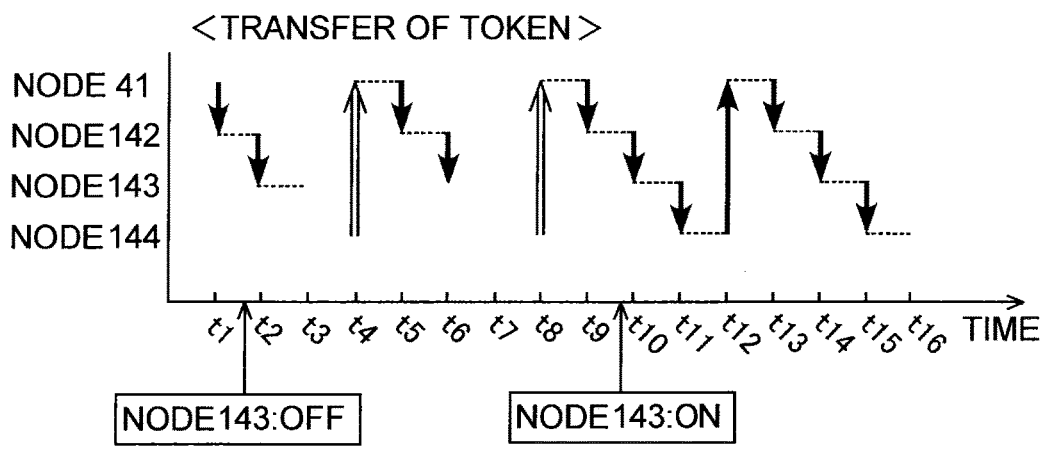
FIG. 3 is a diagram showing transfer of tokens over time in the configuration shown in FIG. 2, each thick arrow indicating transfer of a token already issued, and each outlined arrow indicating transfer of a reissued token.

Referring to FIG. 3 to FIG. 6, a description will be provided on an example in which the node 143 is powered off and then the power source of the node 143 is recovered. In this case, the token is transferred as shown in FIG. 3 as time elapses. At time t1, the token is transferred from the node 41 to the succeeding node, namely, the node 142. This means that the node 142 has the token at this time point. It is assumed that, immediately thereafter, the node 143 is powered off.

Then, at time t2, the node 142 transmits the token to the succeeding node, namely, the node 143, without being affected by the power-off of the node 143. However, the node 143 is unable to receive the token. Hence, the node 143 is unable to transmit the token to the succeeding node, namely, the node 144.

Therefore, the node 144 is unable to receive the token at time t4. Thus, the node 144 reissues a token, i.e., performs a retry, and transmits the reissued token to the succeeding node, namely, the node 41. Subsequently, from time t5 to time t8, the same processing as that carried out from time t1 to time t4 is carried out. More specifically, the node 144 reissues a token again at time t8.

It is assumed that the power source of the node 143 is recovered after time t9. Then, at time t10, the node 143 receives the token transmitted from the preceding node, namely, the node 142. Therefore, at time t11, the node 143 transmits the token to the succeeding node, namely, the node 144. Thus, at time t12, the node 144 transmits the received token to the succeeding node, namely, the node 41, without reissuing a token.

Figure 4:
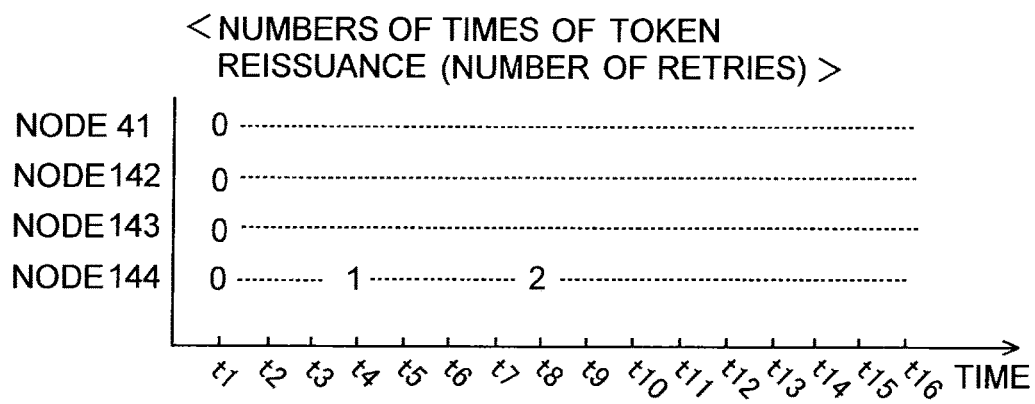
FIG. 4 is a diagram showing the numbers of times of token reissuance (the number of retries) at communication processing nodes in the state shown in FIG. 3.

The numbers of retries of the nodes 41, 142, 143, and 144 in the case where a token is transferred as shown in FIG. 3 will be described with reference to FIG. 4. The numbers of retries of the nodes 41, 142, and 143 remain zero during the period of time t1 to time t16. Meanwhile, the number of retries of the node 144 is one at time t4, two at time t8, and remains two thereafter.

Figure 5:
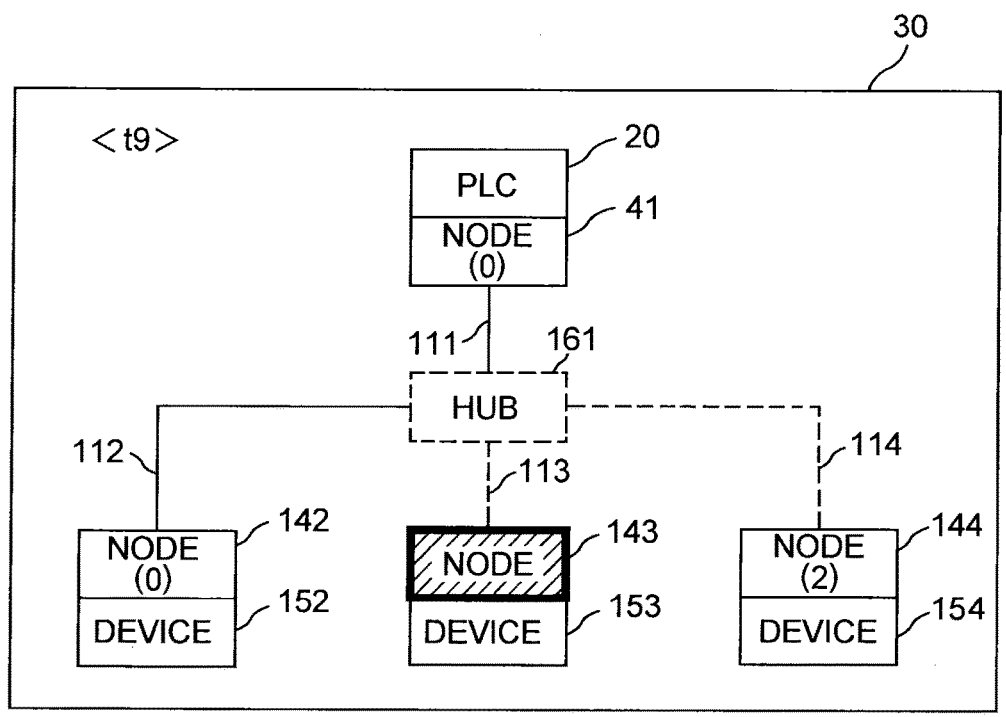
FIG. 5 is a diagram showing display contents of a display device at time t9 in FIG. 3.

A description will now be provided on the display contents of the display device 30 at time t9 and time t13 mentioned above. The display contents of the display device 30 at time t9 are as shown in FIG. 5. In the FL-net 100, for example, if a certain device has been powered off, the other devices will be able to recognize that the device has been powered off. Thus, the PLC 20 is able to recognize that the node 143 has been powered off. Hence, the display device 30 displays the node 143 as a node in which a device failure has occurred, by using, for example, a red color (the combination of a thick line and hatching in FIG. 5).

Further, at time t9, the number of retries of the node 144 is two. If the number of retries of any one of the nodes 41, 142, 143, and 144 reaches a set number of times (2 in this case), the PLC 20 recognizes that the communication lines connecting the node, whose number of retries has reached the set number of times, and its preceding node are in an incommunicable state. Accordingly, the display device 30 displays the communication lines 113, 114 and the hub 161, which are in the incommunicable state, as lines requiring caution, by using, for example, a yellow color (the dashed lines in FIG. 5).

The display device 30 further displays the numbers of retries at the places of the nodes 41, 142, and 144 that are normal. In FIG. 5, the numbers of retries are indicated by parenthesized numerals at the nodes. The numbers of retries of the nodes 41 and 142 are zero, while the number of retries of the node 144 is two.

Thus, at time t9, the display device 30 enables an operator to identify a node in which a device failure has occurred, and also to identify the location of the node in which the device failure has occurred, in the entire network configuration diagram. The display device 30 further enables the operator to recognize the lines that have caused the retries and to determine the degree of the failure, based on the numbers of retries.

Figure 6:
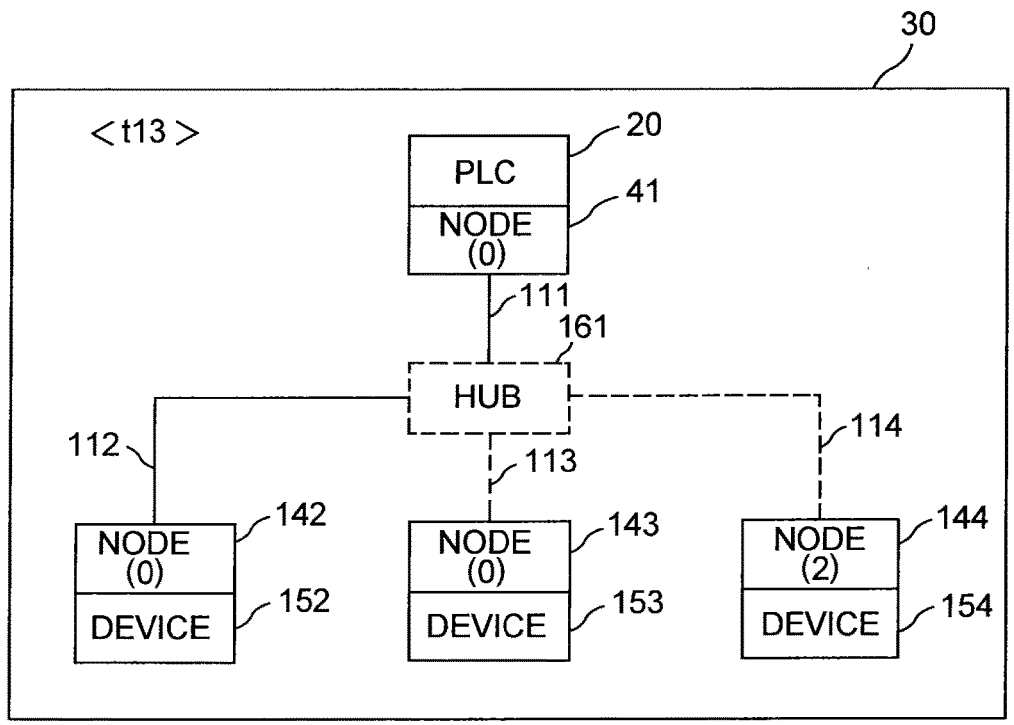
FIG. 6 is a diagram showing display contents of the display device at time t13 in FIG. 3.

The display contents of the display device 30 at time t13 are as shown in FIG. 6. At time t13, the failure of the node 143 has been eliminated because the power source of the node 143 has been recovered. Accordingly, as shown in FIG. 6, the display device 30 displays that the node 143 is normal. However, the communication lines 113, 114 and the hub 161, which have caused the retries, remain marked as the lines requiring caution by using, for example, a yellow color (the dashed lines in FIG. 6). Further, the number of retries of the node 144 remains two. Since the lines requiring caution and the numbers of retries continue to be displayed after the device failure is eliminated as described above, it is possible to confirm afterwards the node in which the device failure has occurred.

Figure 7:
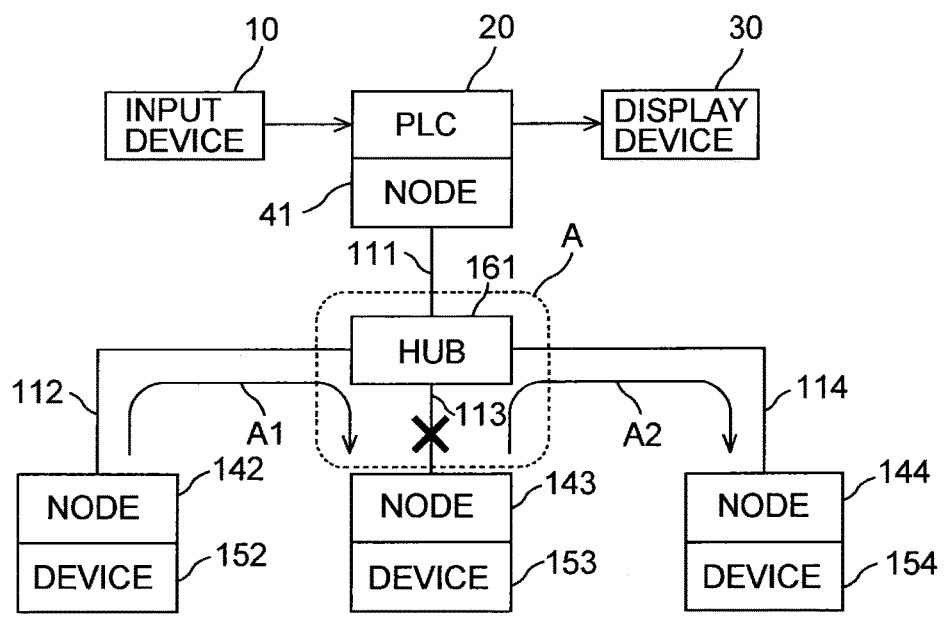
FIG. 7 is a diagram showing a case where a portion (indicated by an x mark) of a communication line is in an incommunicable state due to disconnection or the like, in the configuration shown in FIG. 2.

Referring now to FIG. 7 to FIG. 10, an example in which a communication failure due to disconnection or the like has occurred in the communication line 113 will be described. As shown in FIG. 7, if a communication failure has occurred in the communication line 113, the node 143 is unable to receive the token transmitted from the node 142. Further, the node 143 transmits a reissued token, but the node 144 is unable to receive the token. Hence, the node 144 reissues a token and transmits the reissued token to the node 41.

Figure 8:
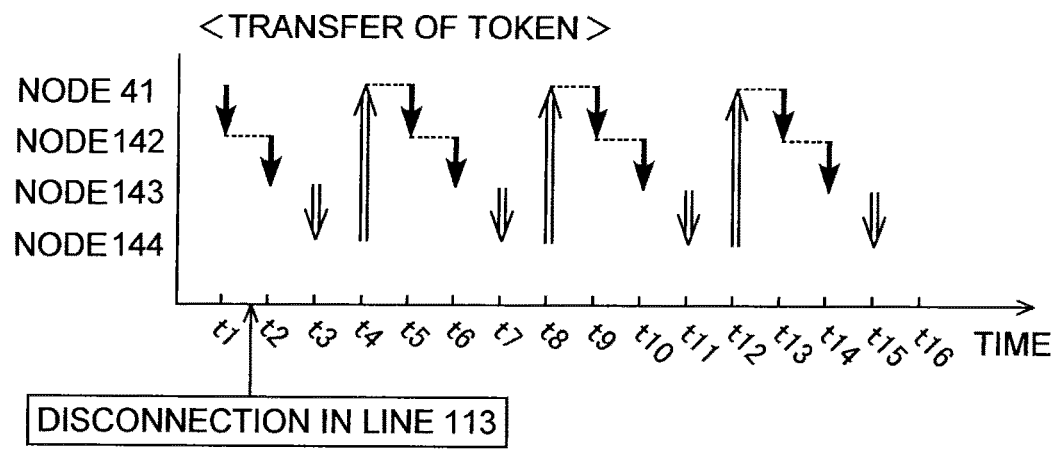
FIG. 8 is a diagram showing transfer of tokens over time in the configuration shown in FIG. 7, each thick arrow indicating transfer of a token already issued, and each outlined line indicating transfer of a reissued token.

The token is transferred as shown in FIG. 8 as time elapses. At time t1, the token is transferred from the node 41 to the succeeding node, namely, the node 142. Immediately thereafter, disconnection occurs in the communication line 113. Subsequently, at time t2, the node 142 transmits the token to the succeeding node, namely, the node 143. However, due to the disconnection of the communication line 113, the node 143 is unable to receive the token. Hence, the node 143 reissues a token, i.e., performs a retry, and transmits the reissued token to the succeeding node, namely, the node 144, at time t3.

Again, due to the disconnection of the communication line 113, the node 144 is unable to receive the token transmitted from the node 143. Hence, the node 144 reissues a token and transmits the reissued token to the node 41 at time t4. Thereafter, the same processing as the processing carried out during the period of time t1 to t4 is carried out during the period of time t5 to t8, during the period of time t9 to t12, and during the period of time t13 to t16.

Figure 9:
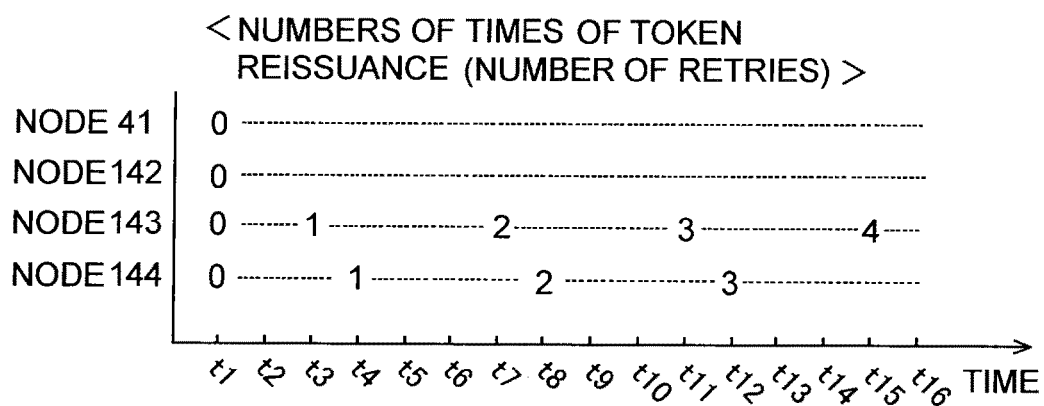
FIG. 9 is a diagram showing the numbers of times of token reissuance (the number of retries) at communication processing nodes in the state shown in FIG. 8.

The numbers of retries of the nodes 41, 142, 143, and 144 in the case where a token is transferred as shown in FIG. 8 will be described below with reference to FIG. 9. The numbers of retries of the nodes 41 and 142 are zero during the period of time t1 to t16. Meanwhile, the number of retries of the node 143 is one at time t3, two at time t7, three at time t11, and four at time t15. The number of retries of the node 144 is one at time t4, two at time t8, and three at time t12.

The display contents of the display device 30 at time t9 mentioned above are as shown in FIG. 7 and FIG. 10. First, referring back to FIG. 7, the relationship among the communication lines in the incommunicable state at time t9 will be described in more detail.

The number of retries of the node 143 is equal to or larger than a set number (two) at time t9. Therefore, the PLC 20 recognizes that the communication lines 112, 113 and the hub 161, which connect the node 143 and its preceding node, namely, the node 142, are in the incommunicable state. In addition, the number of retries of the node 144 is equal to or larger than the set number. Therefore, the PLC 20 recognizes that the communication lines 113, 114 and the hub 161, which connect the node 144 and the preceding node, namely, the node 143, are in the incommunicable state.

In other words, at time t9, there is a plurality of types of incommunicable states as indicated by arrows A1 and A2 in FIG. 7. The hub 161 and the communication line 113 encircled by A in FIG. 7 form a portion where the plurality of communication lines constituting the incommunicable states overlap with each other. Each of the communication lines 112 and 114 constitutes a single incommunicable state.

Figure 10:
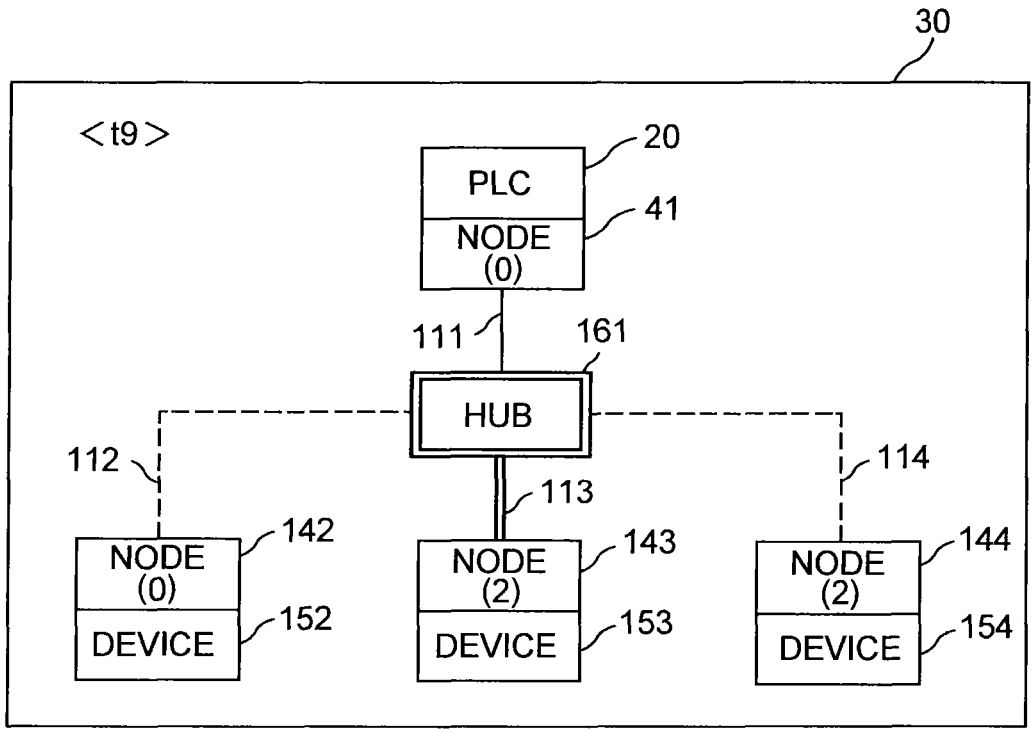
FIG. 10 is a diagram showing display contents of the display device at time point t9 in FIG. 7.

The display contents of the display device 30 in this case are as shown in FIG. 10. The display device 30 displays the portion encircled by A in FIG. 7, as a line failure portion, by using, for example, a purple color (double lines in FIG. 10). The display device 30 also displays the communication lines 112 and 114 as the lines requiring caution, by using a yellow color (dashed lines in FIG. 10).

Further, the display device 30 displays the numbers of retries at the places of the nodes 41, 142, 143, and 144. As shown in FIG. 10, at time t9, the numbers of retries of the nodes 41 and 142 are zero, while the numbers of retries of the nodes 143 and 144 are two.

As described above, the display device 30 displays the portion in which the plurality of types of incommunicable states overlap with each other, as the line failure portion. It is apparent that FIG. 8, which shows the line failure by utilizing the fact that the token is transferred in order in the FL-net, is different from FIG. 3 showing the device failure. Further, when the plurality of types of incommunicable states overlap with each other, it is possible to distinguish the communication line failure from the device failure, and thus, it is possible to recognize that the communication line failure has occurred.

Further, if a plurality of incommunicable communication lines overlap with each other, an overlapping portion (the overlapping communication lines and the hub in the present embodiment) among many communication lines is highly likely to be abnormal. Thus, since the display device 30 displays the overlapping portion in a display manner different from a display manner in which other portions are displayed, the operator is able to identify the communication line failure portion. Especially by displaying the entire network configuration diagram and then displaying the line failure portion in the display manner different from the display manner in which the other portions are displayed, it is possible to identify the location of the line failure portion.

In the above configuration, even when no line failure and no device failure have occurred, the display device 30 displays lines requiring caution in some cases. In other words, the lines displayed as the lines requiring caution are communication lines constituting an incommunicable state. Even when a line failure has not occurred, by recognizing the communication lines that constitute the incommunicable state, it is possible to alert an operator working as a system administrator. This prevents occurrence of a line failure. Further, by displaying the numbers of retries, it is possible to predict a line failure, and thus, it is possible to further alert the operator.

In the foregoing embodiment, the description has been provided on the FL-net 100. The same virtually applies to the FL remote 200. More specifically, a PLC communication system that includes the FL remote 200 also enables an operator to recognize a line failure. As described above, since the FL remote is a form of the FL-net, each of the nodes constituting the FL remote 200 transfers a token in a predetermined order, as in the case of the FL-net. Further, in the foregoing embodiment, the entire network configuration diagram is displayed to allow a failed portion to be recognized in the entire displayed network configuration diagram. Alternatively, only the name or address of a failed portion may be displayed without displaying the entire network configuration diagram.

Figure 11:
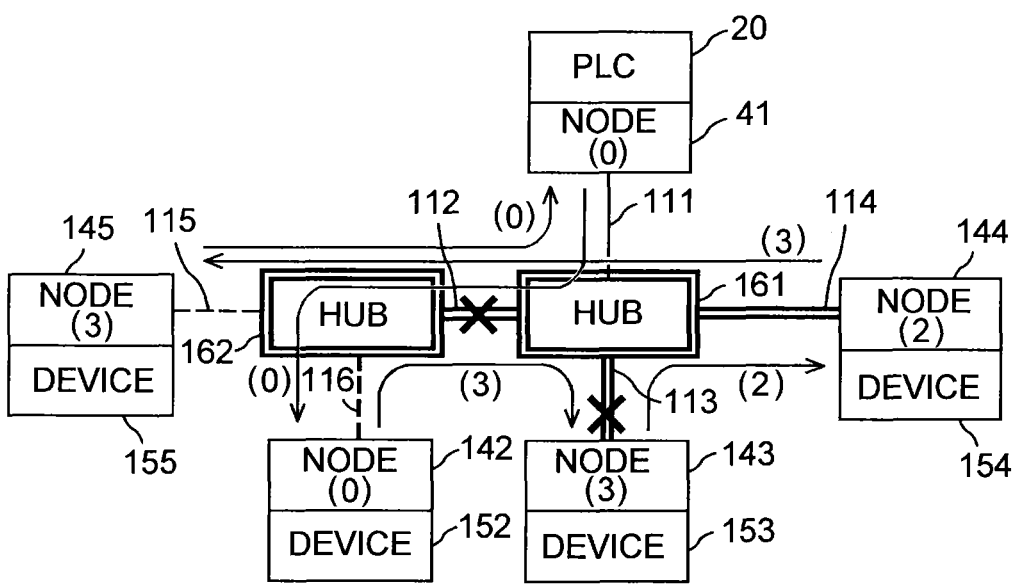
FIG. 11 is a diagram relating to a second embodiment, and showing a network configuration of a portion extracted from the FL-net in the PLC communication system shown in FIG. 1, arrows indicating transfer paths through which a token is transferred, parenthesized numerals indicating the numbers of times of token reissuance (the numbers of retries) in paths that have caused the retries, and x marks indicating disconnection portions in the communication lines.

A description will now be provided on the display contents of the display device 30 in a network configuration shown in FIG. 11. Referring to FIG. 11, a PLC communication system includes the input device (not shown), the PLC 20, the display device (not shown), the nodes 41 and 142 to 145, the devices 152 to 155, hubs 161 and 162, and communication lines 111 to 116. It is assumed that the communication lines 112 and 113 have failed due to disconnection or the like. The nodes transmit tokens in the arrowed directions. The numbers of retries of the nodes are indicated by parenthesized numerals at the places of the nodes. The numbers of retries are also shown near the arrows indicating the transfer paths through which a token is transferred.

In this case, the display device 30 displays the communication lines 112, 113, 114 and the hubs 161, 162 as line failure portions, by using a purple color (double lines in FIG. 11). The communication lines 115 and 116 are displayed by using a yellow color (dashed lines in FIG. 11). The rest is displayed as normal.

Thus, the communication lines 112 and 113, in which disconnection has occurred, are displayed as the line failure portions. The portions displayed as the line failure portions include the communication line 114 and the hubs 161 and 162 in addition to the communication lines 112 and 113. However, the communication lines 112 and 113 in which disconnection has actually occurred can be detected early by checking the portions displayed as the line failure portions.

Further, by displaying the numbers of retries, it is possible to recognize the portions indicating a large number of retries. For example, in FIG. 11, among the portions displayed as the line failure portions, the communication line 112 and the hubs 161 and 162 are portions indicating a large number of retries. These portions include two different paths indicating three retries. In the case where there are a plurality of line failure portions as described above, by displaying the numbers of retries, it is possible to give a higher priority to the portion indicating a larger number of retries. In other words, the portion indicating a larger number of retries can be preferentially checked for the presence of an actual failure and can be therefore recovered early.

Figure 12:
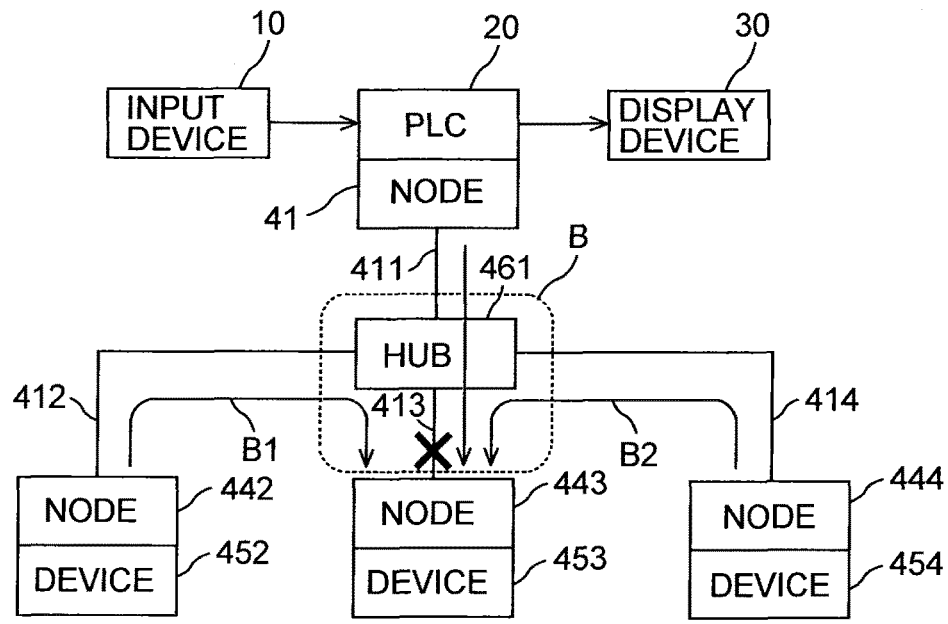
FIG. 12 is a diagram relating to a third embodiment, and showing a network configuration in a case where the Transmission Control Protocol (TCP) is applied, arrows indicating transmission paths through which data is transmitted, and an x mark indicating a disconnection portion in the communication lines.

A description will be provided on a case where the Transmission Control Protocol (TCP) is applied to a PLC communication system according to an embodiment. As shown in FIG. 12, the PLC communication system includes the input device 10, the PLC 20, the display device 30, nodes 41, 442 to 444, devices 452 to 454, a hub 461, and communication lines 411 to 414. It is assumed that the communication line 413 has failed due to disconnection or the like.

Each of the nodes 41, 442 to 444 transmits data to another node according to the destination address to which the data is to be transmitted. If the data is unable to be transmitted, each of the nodes 41, 442 to 444 carries out retry processing for retransmitting the data. FIG. 12 shows an example in which the nodes 41, 442, and 444 transmit data to the node 443, as indicated by arrows B1 and B2.

In this example, in the case where the retry processing has been carried out a set number of times (two in this example), the PLC 20 recognizes that the communication line connecting a source node and a destination node is in the incommunicable state. More specifically, the PLC 20 recognizes that the transmission path from the node 41 to the node 443 is in the incommunicable state, that is, the communication lines 411, 413 and the hub 461 are in the incommunicable state, and defines the incommunicable state as a first incommunicable state. The PLC 20 recognizes that the transmission path from the node 442 to the node 443 in the incommunicable state, that is, the communication lines 412, 413 and the hub 461 are in the incommunicable state, and defines the incommunicable state as a second incommunicable state. The PLC 20 further recognizes that the transmission path from the node 444 to the node 443 is in the incommunicable state, that is, the communication lines 413, 414 and the hub 461 are in the incommunicable state, and defines the incommunicable state as a third incommunicable state.

Figure 13:
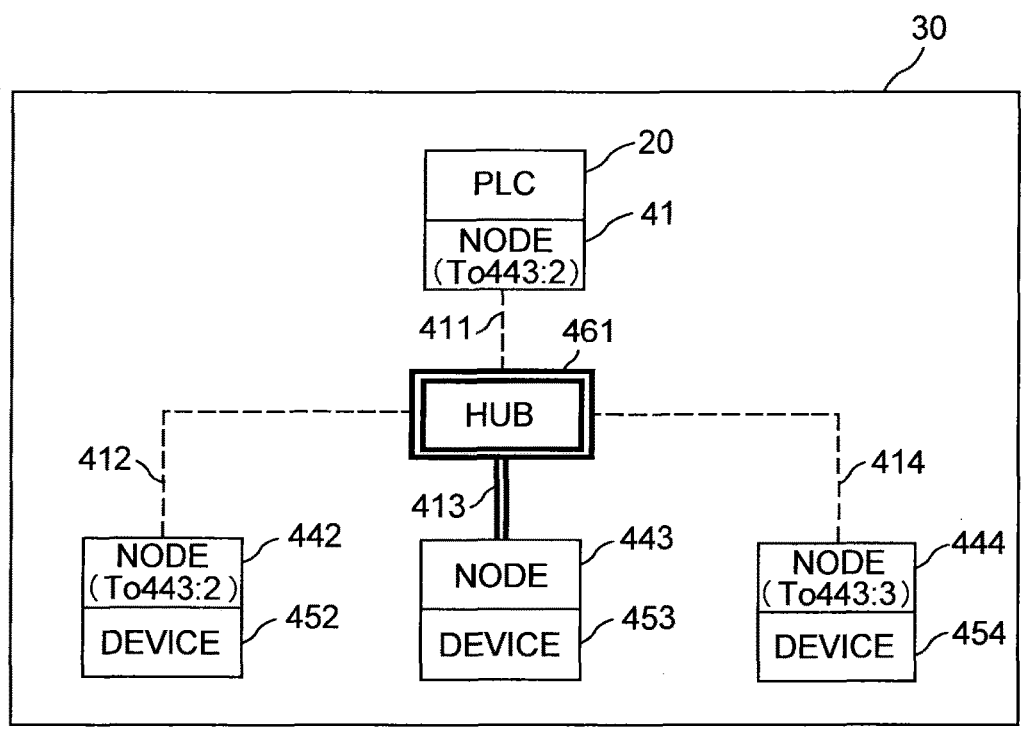
FIG. 13 is a diagram showing display contents of the display device at a time point after a given time elapses in the state shown in FIG. 12, a description (To 443:2) signifying that the number of times processing of retransmitting data to a node 443 has been carried out (the number of retries) at a node having the description is two.

The display contents of the display device 30 in this case are as shown in FIG. 13. The portions in which the communication lines that constitute the plurality of incommunicable states overlap with each other, namely, the hub 461 and the communication line 413 are displayed as the line failure portions, by using a purple color (double lines in FIG. 13). Further, the communication lines each of which constitutes the single incommunicable state, namely, the communication lines 411, 412, and 414 are displayed as the lines requiring caution, by using a yellow color (dashed lines in FIG. 13). The destination for which the retry processing has been carried out and the number of the retries are displayed at each node.

Thus, also in the case where the TCP is applied, the communication line failure portion can be detected early. By displaying the lines requiring caution and the number of retries, it is possible to alert an operator. Although not shown, if there is a plurality of communication lines having line failures, a higher priority can be given to a communication line having a greater number of retries. This contributes to early recovery, as in the foregoing embodiment.

Figure 14:
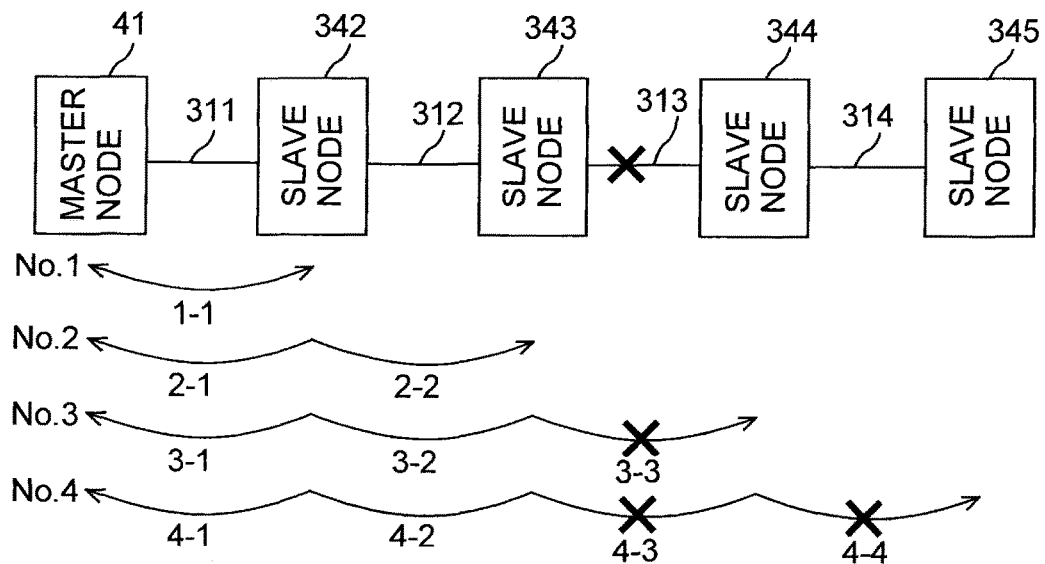
FIG. 14 is a diagram relating to a fourth embodiment, showing a network configuration of a portion that constitutes a daisy chain, and is extracted from the DeviceNet (registered trademark) in the PLC communication system shown in FIG. 1, and showing the order of transmitting data.

Referring now to FIG. 14, a PLC communication system according to an embodiment will be described. The PLC communication system according to the present embodiment corresponds to a portion of the network system shown in FIG. 1, the portion including the input device 10, the PLC 20, the display device 30, the node 41, and the DeviceNet 300. In the DeviceNet 300, the node 41 functioning as a master (hereinafter referred to as "the master node") transmits data to the remaining nodes, namely, the nodes 342, 343, 344, and 345, which function as slaves (hereinafter referred to as "the slave nodes").

However, if the DeviceNet 300 has therein a daisy chain as shown in FIG. 14, the data from the master node 41 is transmitted through another slave node (e.g. the node 342) to the succeeding slave node (e.g. the node 343) connected with the other slave node. In other words, the master node 41 is interconnected, through other slave nodes, to succeeding slave nodes connected to the other slave nodes. In this case, the same concept described above can be applied to display line failures.

FIG. 14 shows the slave nodes 342, 343, 344, and 345 connected in sequence to the master node 41 by the daisy chain. In this case, the data from the master node 41 is transmitted to the slave nodes 342, 343, 344, and 345 in this order, as indicated by No. 1 to No. 4 in FIG. 14.

It is assumed that the communication line 313 connecting the slave node 343 and the slave node 344 in FIG. 14 has failed due to disconnection. At this time, the data transmission shown at No. 3 fails at a portion denoted by 3-3, while the data transmission shown at No. 4 fails at portions denoted by 4-3 and 4-4. These incommunicable states are recognized by the PLC 20.

Figure 15:
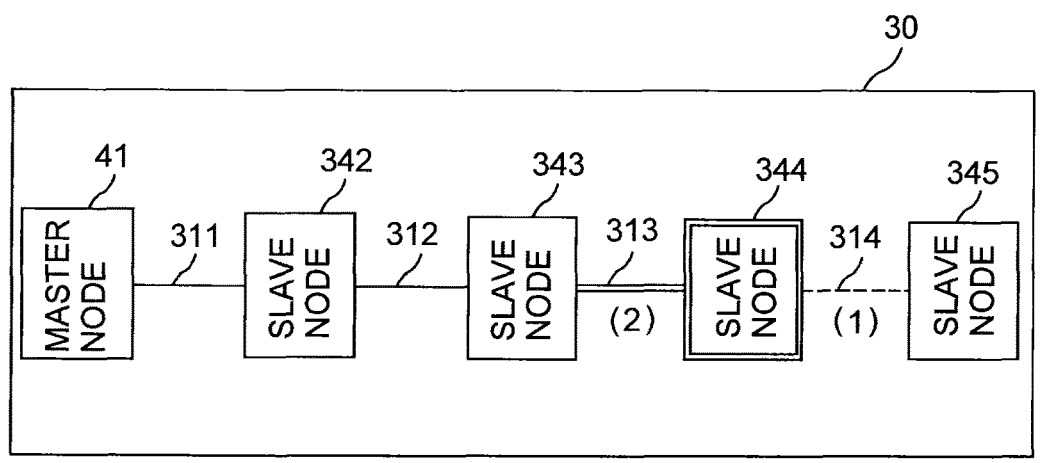
FIG. 15 is a diagram showing display contents of the display device in the state shown in FIG. 14.

The display contents of the display device 30 in the foregoing case are as shown in FIG. 15. As shown in FIG. 15, the display device 30 displays the portion where communication paths constituting the plurality of the incommunicable states overlap with each other, namely, the portion of the communication line 313, as a line failure portion, by using a purple color (double lines in FIG. 15). Further, the portion of the communication line 314 is displayed as the line requiring caution, by using a yellow color (a dashed line in FIG. 15).

Thus, in the case of the daisy chain, the above-described display contents enable an operator to determine a failed portion in the communication lines. When the entire network configuration diagram is displayed and a line failure portion is displayed in the entire network configuration diagram, the operator can easily identify the location of the line failure portion.

What is claimed is:

1. A programmable logic controller communication system comprising:
 a programmable logic controller;
 a plurality of devices;
 three or more communication processing nodes that are provided respectively in the programmable logic controller and the devices to allow the programmable logic controller to communicate with each of the devices; and
 a plurality of communication lines that connect the communication processing nodes to each other so as to allow data communication,
 wherein the programmable logic controller detects a first incommunicable state of a first plurality of the communication lines between a first communication processing node connected to a first device and a second communication processing node connected to a second device,
 wherein the programmable logic controller detects a second incommunicable state of a second plurality of the communication lines between the second communication processing node connected to the second device and a third communication processing node connected to a third device,
 wherein the programmable logic controller determines a communication line of the first plurality of communication lines overlapping with a communication line of the second plurality of communication lines to be a line failure, and
 wherein the programmable logic controller communication system further includes a display device and the display device displays a location of the line failure.

2. The programmable logic controller communication system according to claim 1, wherein the
 display device displays an entire communication line diagram, and
 displays a location of the line failure in a display manner different from a display manner in which other portions are displayed in the communication line diagram.

3. The programmable logic controller communication system according to claim 1, wherein the display device displays a communication line other than the line failure among the first and second plurality of communication lines that constitute the first and second detected incommunicable states as a line requiring caution in a display manner different from a display manner in which the line failure is displayed.

4. The programmable logic controller communication system according to claim 1,
 wherein each of the communication processing nodes carries out retry processing in a case where a communication processing node is unable to communicate with other communication processing nodes, and
 wherein the display device further displays a number of times the retry processing has been carried out at each of the communication processing nodes.

5. The programmable logic controller communication system according to claim 1,
 wherein each of the communication processing nodes transmits and receives a token in order, and in a case where the second communication processing node does not receive the token from the first communication processing node, the second communication processing node carries out retry processing for transmitting a reissued token, generated locally, to the third communication processing node, and
 wherein in a case where the retry processing has been carried out a set number of times, the programmable logic controller recognizes that the first plurality of communication lines connecting the first communication processing node and the second communication processing node is in the first incommunicable state.

6. The programmable logic controller communication system according to claim 1,
 wherein the first communication processing node transmits data to the second communication processing node according to a destination address to which the data is to be transmitted, and carries out retry processing for retransmitting the data in a case where the data is unable to be transmitted, and
 wherein in a case where the retry processing has been carried out a set number of times, the programmable logic controller recognizes the first plurality of communication lines that connects the first communication processing node and the second communication processing node is in the first incommunicable state.

7. The programmable logic controller communication system according to claim 1, wherein the plurality of communication lines are external to the programmable logic controller, the plurality of devices, and the communication processing nodes.

* * * * *